(12) United States Patent
Knoerzer et al.

(10) Patent No.: US 6,948,701 B2
(45) Date of Patent: Sep. 27, 2005

(54) ARTICULATED CABLE PULLER (75) Inventors: L. Paul Knoerzer, St. John, IN (US); Fred P. Smith, Alpine, UT (US); Todd Mendenhall, Alpine, UT (US)

(73) Assignee: Ok Champion Corporation, Hammond, IN (US)

( * ) Notice: Subject to any disclaimer, the term of this patent is extended or adjusted under 35 U.S.C. 154(b) by 0 days.

(21) Appl. No.: 09/961,644

(22) Filed: Sep. 24, 2001

(65) Prior Publication Data

US 2002/0100898 A1 Aug. 1, 2002

Related U.S. Application Data (60) Provisional application No. 60/234,685, filed on Sep. 22, 2000.

(51) Int. Cl.[7] ................................................. B23Q 3/08
(52) U.S. Cl. ........................................... 254/134.3 FT
(58) Field of Search ................. 254/134.3 R, 134.3 FT, 254/134.3 PA (56) References Cited

U.S. PATENT DOCUMENTS

| | | | |
|---|---|---|---|
| 823,414 A | * | 6/1906 | Knox et al. ........... 254/134.3 R |
| 2,731,233 A | | 1/1956 | Lindsay |
| 2,984,222 A | | 5/1961 | Smith |
| 3,226,088 A | | 12/1965 | Habighorst |
| 3,244,292 A | | 4/1966 | Elliott |
| 3,348,811 A | | 10/1967 | Pierce, Jr. |
| 4,095,326 A | | 6/1978 | Harvey |
| 4,468,003 A | | 8/1984 | Nonclercq et al. |
| 4,469,306 A | | 9/1984 | Wimer et al. |
| 4,609,180 A | | 9/1986 | Fisher et al. |
| 5,193,785 A | | 3/1993 | McVaugh |
| 5,209,457 A | * | 5/1993 | McVaugh ............ 254/134.3 R |
| 5,232,205 A | | 8/1993 | McVaugh |
| 5,516,080 A | | 5/1996 | McVaugh |

* cited by examiner

*Primary Examiner*—Robert C. Watson
(74) *Attorney, Agent, or Firm*—DLA Piper Rudnick Gray Cary US LLP

(57) ABSTRACT

An articulated cable puller includes a boom assembly having a boom with a sheave positioned thereon. The boom is mounted upon a load beam and is movable between generally horizontal and vertical positions. A rotatable base is positioned upon a vehicle and has a rectangular link pivotally attached thereto. An A-frame is pivotally attached to the top of the link and features a tube attached to its top side. The load beam features downward extending ears that are secured to the tube of the A-frame by a pin. Hydraulic cylinders are connected between the base and the load beam and frame and may be actuated to adjust the positioning of the boom assembly. Hydraulic cylinders are also positioned between the vehicle and the base and are actuated to adjust the position of the base.

19 Claims, 10 Drawing Sheets

ARTICULATED CABLE PULLER

This application claims priority from U.S. Provisional Patent Application Ser. No. 60/234,685, filed Sep. 22, 2000.

BACKGROUND OF THE INVENTION

The present invention relates generally to mobile apparatuses for pulling cables through an underground conduit and, more particularly, to an articulated cable puller that positions an element, such as a sheave or the like, that is secured on the end of a boom of the apparatus at a precise location with respect to the vehicle on which the apparatus is mounted.

Public utilities use large amounts of underground electrical cable, such as electric power cable, telephone and telegraph cable. In addition, there are underground railroad and other public transportation cable systems, fire and police department cable systems and traffic control signal generation cables and the like. The preferred place of installation for these types of cables is below ground in conduits which protect the cables from weather. In addition, underground cables do not disrupt the environment, either from an aesthetic point of view or from the very real practical problem of supporting many cables on overhead lines. Overhead lines have the further disadvantage of being susceptible to vandalism. In addition, they present potential danger to the population when cables may fall because of accidents, storms and the like.

However, even the best underground cable systems ultimately deteriorate. Underground cables that deteriorate must be replaced. Furthermore, the extensive increase in the use of fiber optic cables has made it desirable to replace cable presently existing with larger, faster, better or otherwise different cables.

The process of cable installation can be expensive and difficult, particularly when many cables are packed together and separated by 400 to 800 feet intervals, which is the typical distance between manhole locations in cities.

Industry has been installing larger and more complex cables which require greater pulling forces to install. Furthermore, in congested areas such as large cities, cables are being positioned at a depth which is 10, 20 or even up to 30 feet below the surface of the pavement. As cables have grown larger and become located deeper, it has become more and more desirable to pull cables in a horizontal direction aligned with the longitudinal axis of the conduit. Pulling a cable in line with the conduit makes the most efficient, and thus effective, use of a given pulling force.

In response, the apparatus illustrated in U.S. Pat. Nos. 5,193,785; 5,209,457 and 5,232,205 to McVaugh was developed. In these patents, an extensible mechanism, such as a boom, is disclosed which features a sheave on one end and a pulling wheel near the other end. The boom may be positioned in a generally vertical orientation so that the sheave is placed in alignment with the longitudinal axis of the conduit. The cable, as it is pulled through the conduit, travels horizontally to the sheave. This allows the force pulling the cable out of the conduit to be aligned with the longitudinal axis of the conduit.

The positioning of the boom by the apparatus disclosed in the McVaugh '785, '457 and '205 patents, however, is limited. It is only possible to lower the boom of the apparatus from the back of the truck upon which it is mounted. The location of a manhole, for example, may require that the boom be lowered from the side of the truck. Furthermore, the arrangement of the hydraulic cylinders supporting the boom disclosed in the McVaugh '785, '457 and '205 patents limits the range of motion of the boom, and thus the positioning of the sheave positioned upon its end.

Additional flexibility in positioning the sheave is necessary, for example, when the longitudinal axis of the conduit to be accessed does not intersect the manhole when viewed from above/in plan.

Accordingly, it is an object of the present invention to provide an articulated cable puller that permits cable to be pulled through conduits in a horizontal direction, thereby optimizing the efficiency of the cable installation apparatus.

It is another object of the present invention is to provide an articulated cable puller that allows cable to be pulled from the back or side of the vehicle supporting the apparatus.

It is another object of the present invention is to provide an articulated cable puller that features increased flexibility in terms of positioning a boom, and thus a sheath or other cable guiding device positioned on its end, within a manhole or similar location.

It is still another object of the present invention to provide an articulated cable puller that features a strong support structure for the boom.

Other objects and advantages will be apparent from the remaining portion of this specification.

SUMMARY OF THE INVENTION

The present invention is directed to an articulated cable puller that includes a boom assembly having a boom with a cable guiding device, such as a sheave, positioned thereon. The boom is preferably extensible along its longitudinal axis and is mounted upon a load beam so as to be movable between generally horizontal and vertical positions.

A movable base is mounted upon a vehicle so as to rotate relative to the vehicle about a vertical axis. A link, preferably constructed of a rectangular framework, is mounted to the base at a first end so as to pivot relative to the base about an axis that is perpendicular to the longitudinal axis of the boom. An A-frame is connected to a second end of the link that is opposite of the first end so as to pivot relative to the link about an axis that is also perpendicular to the longitudinal axis of the boom. The load beam of the boom assembly includes downward extending ears while a tube is mounted to the top of the A-frame so that the boom assembly is pivotally mounted to the A-frame by a pin passing through the ears and tube. As a result, the boom assembly pivots or tilts relative to the A-frame about a horizontal axis that is parallel to the longitudinal axis of the boom.

A pair of aligned yaw and raise cylinders are attached between the base and the sides of the boom assembly so that the boom assembly may be tilted with respect to the frame and raised with respect to the base. An extension cylinder is attached between the base and the A-frame so that the link may be pivoted relative to the base and the A-frame may be pivoted relative to the base and link. A pair of swivel cylinders are connected between the base and the vehicle so that when the swivel cylinders are activated, the base is rotated.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
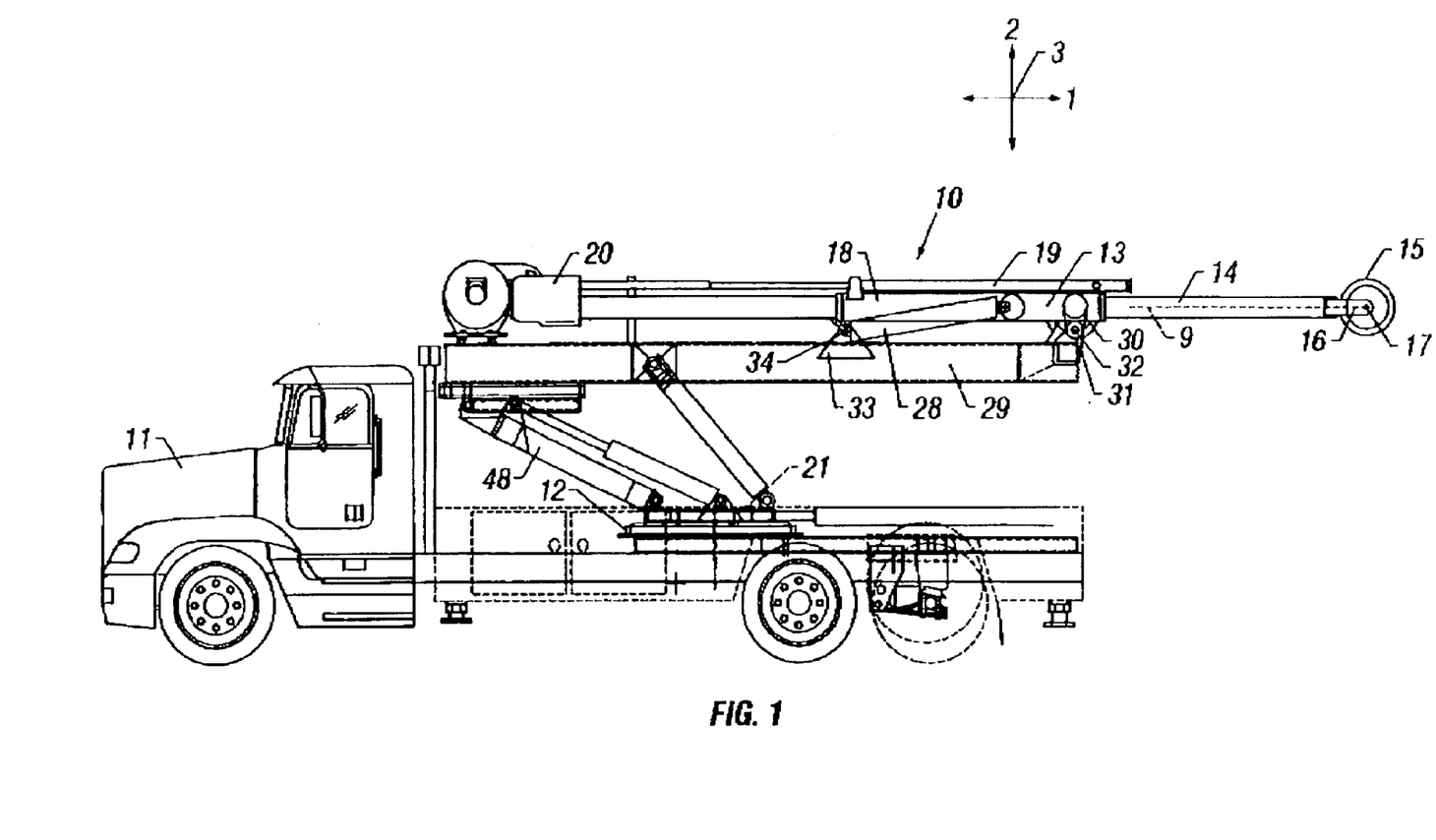
FIG. 1 is a side elevation view of an embodiment of the articulated cable puller of the present invention mounted on a truck with the boom in the stowed position.

An embodiment of the articulated cable puller of the present invention is indicated in general at 10 in FIG. 1. The articulated cable puller 10 is connected to a truck 11 by a turntable bearing 12 and features a boom assembly 13. The articulated cable puller of the present invention provides improved flexibility and accuracy in placing a pulling sheave mounted on the end of a boom in a particular position. It should be noted that while the invention is described herein in terms of a device for cable installation, it could also be employed in removal or other cable-related operations.

The boom assembly 13 may be as shown in prior art U.S. Pat. No. 5,232,205 to McVaugh, the contents of which are incorporated herein by reference, or it may be any other means for extending a sheave, with any means for turning the sheave around the longitudinal axis 9 of the boom 14. The boom assembly 13 of FIG. 1, and the one disclosed in the McVaugh '205 patent, consists of a tubular boom 14 with a pulling sheave 15, or other cable guiding device, rotatably mounted to one end by ears 16 and axle 17. The end of the boom 14 opposite the sheave is connected to a sheave rotation head 20. The sheave rotation head 20 contains a motor or other means for rotating a shaft that connects to the sheave 15 so that the sheave may be rotated about the longitudinal axis 9 of the boom. The boom 14 is positioned within a housing 18 such that the boom 14 can slide in a longitudinal direction with respect to housing 18. The boom extension cylinder 19 is connected to housing 18 at one end and to the sheave rotation head 20 at the other. As shown in the McVaugh '205 patent, the boom 14 may also be telescopic using a cylinder inside the boom 14 to extend telescopic sections.

Figure 6:
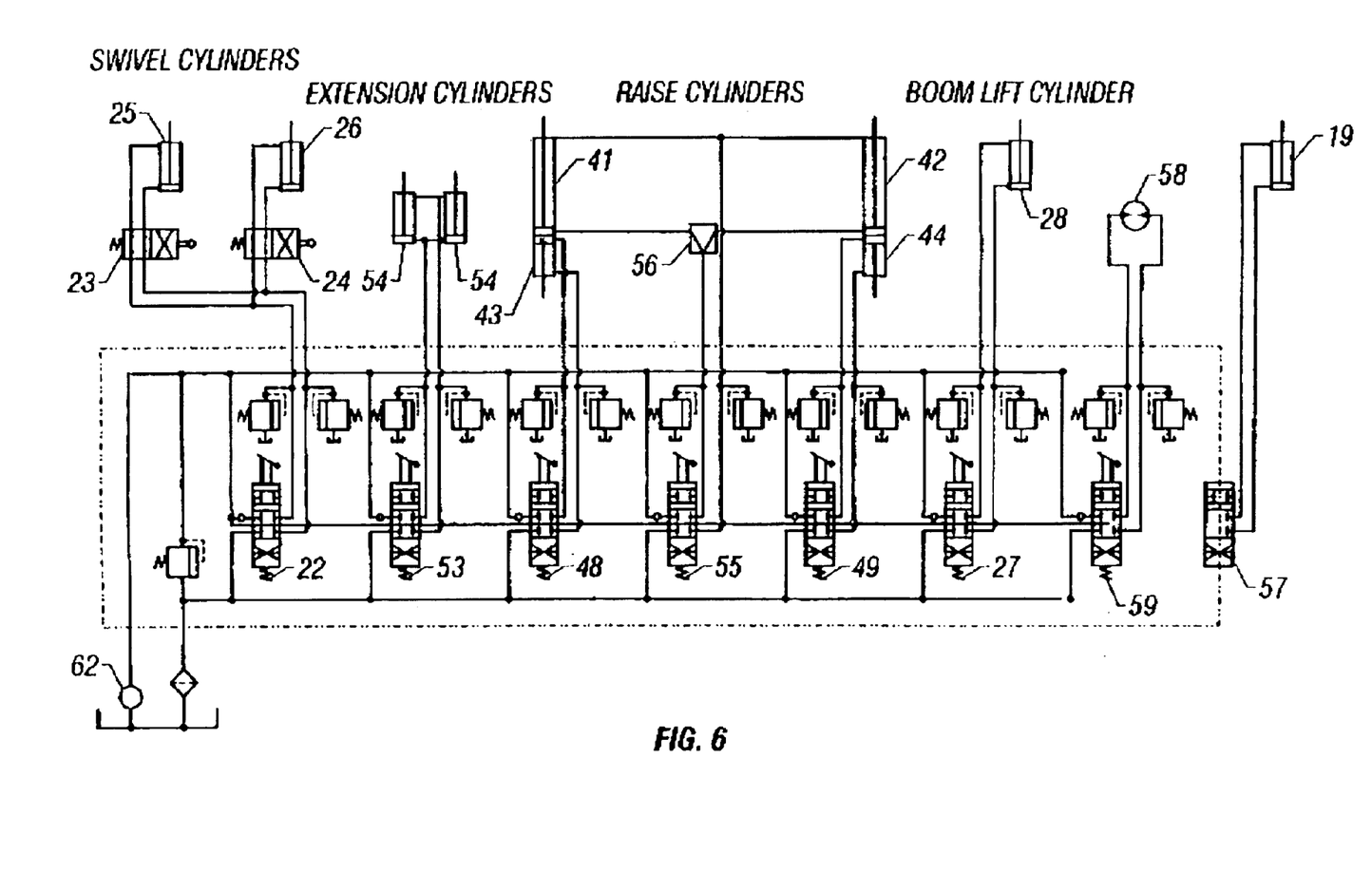
FIG. 6 is a schematic of the hydraulic control system for operating the articulated cable puller of FIG. 1.

The hydraulic control system of the articulated cable puller of FIG. 1 is illustrated in FIG. 6. When the operator shifts the sheave rotation valve 59, the motor 58 that is within the sheave rotation head 20 of FIG. 1 is activated. As a result, the sheave at the end of the boom 14 of FIG. 1 rotates about the longitudinal axis of the boom. In addition, with reference to FIG. 6, the boom extension cylinder 19 extends or retracts when the operator shifts boom valve 57. This causes the boom 14 of FIG. 1 to slide with respect to the housing 18 of FIG. 1 as the sheave rotation head 20 and housing are pulled towards one another or pushed apart by boom extension cylinder 19. It should be noted that the hydraulics to actuate the stabilizer legs (discussed below) or the detail hydraulics of the boom assembly are not illustrated in FIG. 6.

Figure 2:
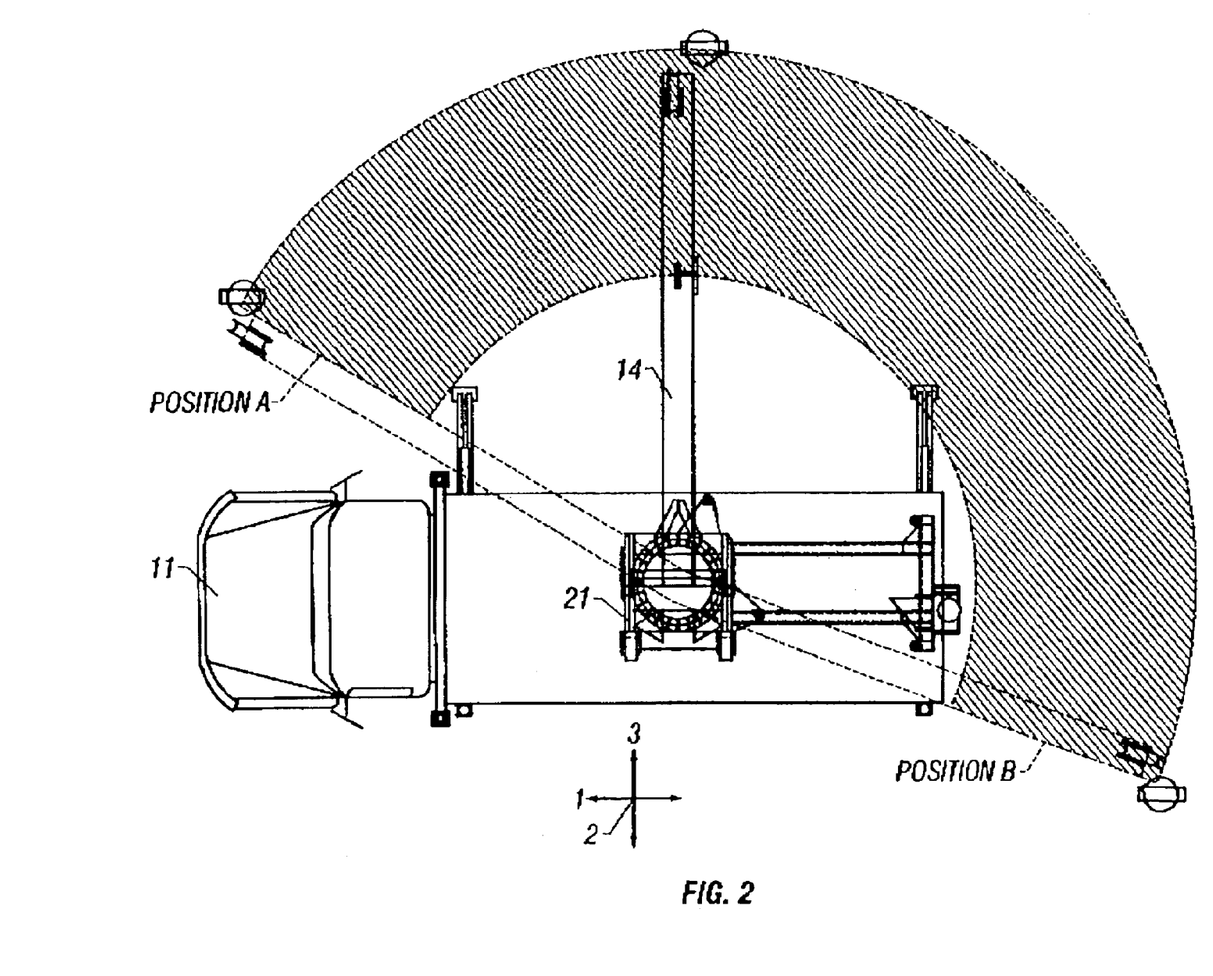
FIG. 2 is a top plan view of the articulated cable puller of FIG. 1 showing the swing coverage available for the boom.

To begin the operation of pulling a cable through an underground conduit, the truck 11 of FIG. 1 is placed in position such that the place of operation (i.e. manhole or other conduit opening) is located to the passenger's side or rear of the truck. It is generally known that it is safer to work behind the truck or on its passenger side. Therefore, as shown in FIG. 2, in the preferred embodiment, the approximately 170 degrees of motion that the boom assembly 13 can rotate around the truck on turntable bearing 12, is set to cover the rear of the truck 11 and most of the passenger side of the truck 11.

Figure 3:
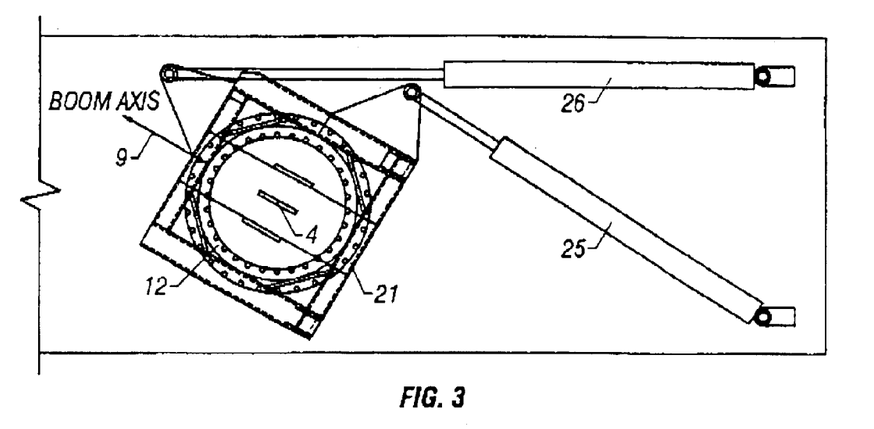
FIG. 3 is a top plan view of the base frame of the articulated cable puller of FIG. 1 with all of the components above it removed for clarity.
Figure 4:
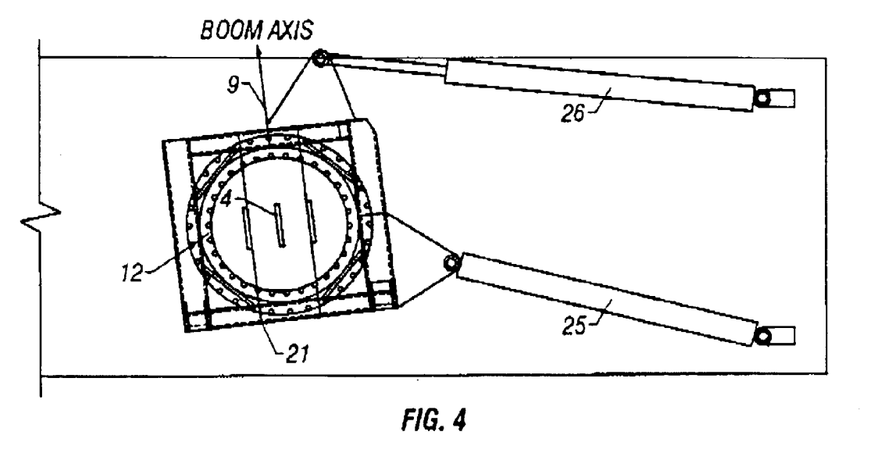
FIG. 4 is a top plan view of the base frame of FIG. 3 showing the base frame rotated clockwise at a position where the driver's side cylinder toggles from pulling to pushing.
Figure 5:
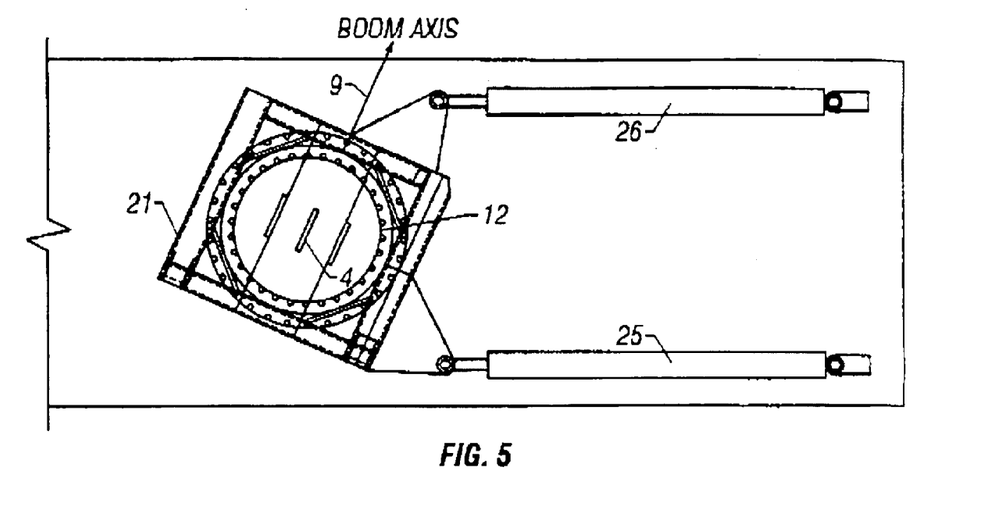
FIG. 5 is a top plan view of the base frame of FIG. 3 showing the base frame at a position approximately halfway through the total swing.

Referring to FIGS. 1–5, the articulated cable puller includes a base frame 21 by which it is mounted to the truck 11. More specifically, the base frame 21 is connected to the turntable bearing 12, which is connected to the truck 11. FIGS. 3–5 illustrate the rear portion of the truck 11 of FIG. 1 with everything above the base frame 21 removed for clarity. In FIGS. 3–5, the base frame is mounted to the truck with the cab off to the left while the base end of the cylinders are mounted towards the rear of the truck.

FIG. 3 is a top view of the base frame 21 with the boom 14 rotated on the passenger side towards the truck. This is shown as position A in FIG. 2. Rotation of the articulated cable puller 10 about the vertical axis 4 of the bearing 12 and base frame 21 is accomplished by shifting swivel cylinder valve 22, as shown in FIG. 6, such that the fluid from the pump 62 flows through de-energized cam valve 23 and de-energized cam valve 24 into the rod ends of driver's side swivel cylinder 25 and passenger's side cylinder 26, respectively. Both swivel cylinders 25, 26 pull the base frame 21 in a clockwise direction when viewed from the top. As will be described in greater detail below, both cam valve 23 and cam valve 24 of FIG. 6 are actuated or shifted by the base frame so as to become energized or de-energized when the base frame turns through predetermined positions. Such cam valves are well known in the art.

When the centerline of the drivers side swivel cylinder 25 intersects the vertical axis of rotation 4 of the turntable bearing 12, as shown in FIG. 4, cam valve 23 of FIG. 6 is shifted to an energized position. As a result, the oil that was flowing to the rod end of drivers side swivel cylinder 25 is now directed into the base end of the driver's side swivel cylinder 25. In this position, drivers side swivel cylinder 25 has no moment arm to produce rotation of the base frame 21 around a vertical axis 2 at the center of turntable bearing 12. Passenger's side swivel cylinder 26, on the other hand, has almost a maximum moment arm to produce rotation of the base frame 21 around a vertical axis 4 at the center of turntable bearing 12.

As the base frame 21 continues to rotate in a clockwise direction, as shown in FIG. 5, the driver's side swivel cylinder 25 is now pushing the base frame 21 in a clockwise direction and the passengers side swivel cylinder 26 is pulling the base frame 21 in a clockwise direction. As the rotation continues, the axis of the passenger's side swivel cylinder 26 intersects the vertical axis of rotation 4 of the turntable bearing 12. At this point, cam valve 24 of FIG. 6 is shifted to an energized position. As a result, the oil that was flowing to the rod end of the passenger side swivel cylinder 26 is now directed into the base end. The driver's side swivel cylinder 25 has almost a maximum moment arm to produce rotation of the base frame 21 around the vertical axis 4 at the center of turntable bearing 12, while the passenger's side swivel cylinder 26 has no moment arm to produce this movement.

As the clockwise movement continues, both swivel cylinders 25, 26 push the base frame 21 around a vertical axis 2. This continues until the operator shuts off valve 22 of FIG. 6 or the driver's side swivel cylinder 25 reaches the until the end of its stroke. The base frame 21 is now in position B as shown in FIG. 2.

The position of the cylinders is such that through the entire cycle as the moment arm of swivel cylinder 25 around the vertical axis 4 at the center of turntable bearing 12 decreases, the moment arm of swivel cylinder 26 increases and vice versa. In this manner, the overall moment to move or hold the base frame 21 around the vertical axis 4 at the center of the turntable bearing 12, remains relatively constant.

To move the base frame 21 in a counter clockwise direction, beginning with the base frame 21 in position B as shown in FIG. 2, the operator moves the swivel cylinder selector valve 22 of FIG. 6 to the opposite position as before. As a result, when both cam valve 23 and cam valve 24 of FIG. 6 are in the energized position, flow from the pump will go to the rod end of the swivel cylinders 25, 26 This will pull the base frame 21 in a counter clockwise direction until the centerline of passenger's side swivel cylinder 26 intersects the vertical axis of rotation 4 of the turntable bearing 12. At this point, cam valve 24 is released and shifts back to its de-energized position. As a result, the oil flow to the passenger's side swivel cylinder 26 is switched from the rod end to the base end.

As the counter clockwise rotation continues, the passenger's side swivel cylinder 26 begins to push to the base frame 21 in a counter clockwise direction. The driver's side swivel cylinder 25 continues to pull the base frame 21 in a counter clockwise direction until its centerline intersects the center of rotation of the turntable bearing 12. At this point cam valve 23 de-energizes and the oil is diverted from the rod end into the base end of the driver's side swivel cylinder 25.

As the counter clockwise rotation continues, both swivel cylinders 25, 26 push the base frame 21 in the counter clockwise direction. This continues until either the passenger's side swivel cylinder 26 comes to the end of its stroke or the operator returns valve 22 of FIG. 6 to its neutral position.

It should be noted that an alternative means for rotating base frame 21 could be employed. More specifically, other arrangements for rotating, including but not limited to a gear drive, could be substituted for the swivel cylinders 25, 26.

As illustrated in FIG. 1, the boom housing 18 is mounted to the load beam 29 by housing ears 30 that cantilever off of the sides of the boom housing 18. The beam ears 31 are cantilever off to the side and end of load beam 29. The housing ears 30 are pivotally connected to the beam ears 31 by pin 32. The base end of the boom lift cylinder 28 is connected to ears 33 by pin 34. Ears 33 are connected to the load beam 29 intermediate the ends. The rod end of the boom lift cylinder 28 is connected to the side of housing 18.

Figure 7:
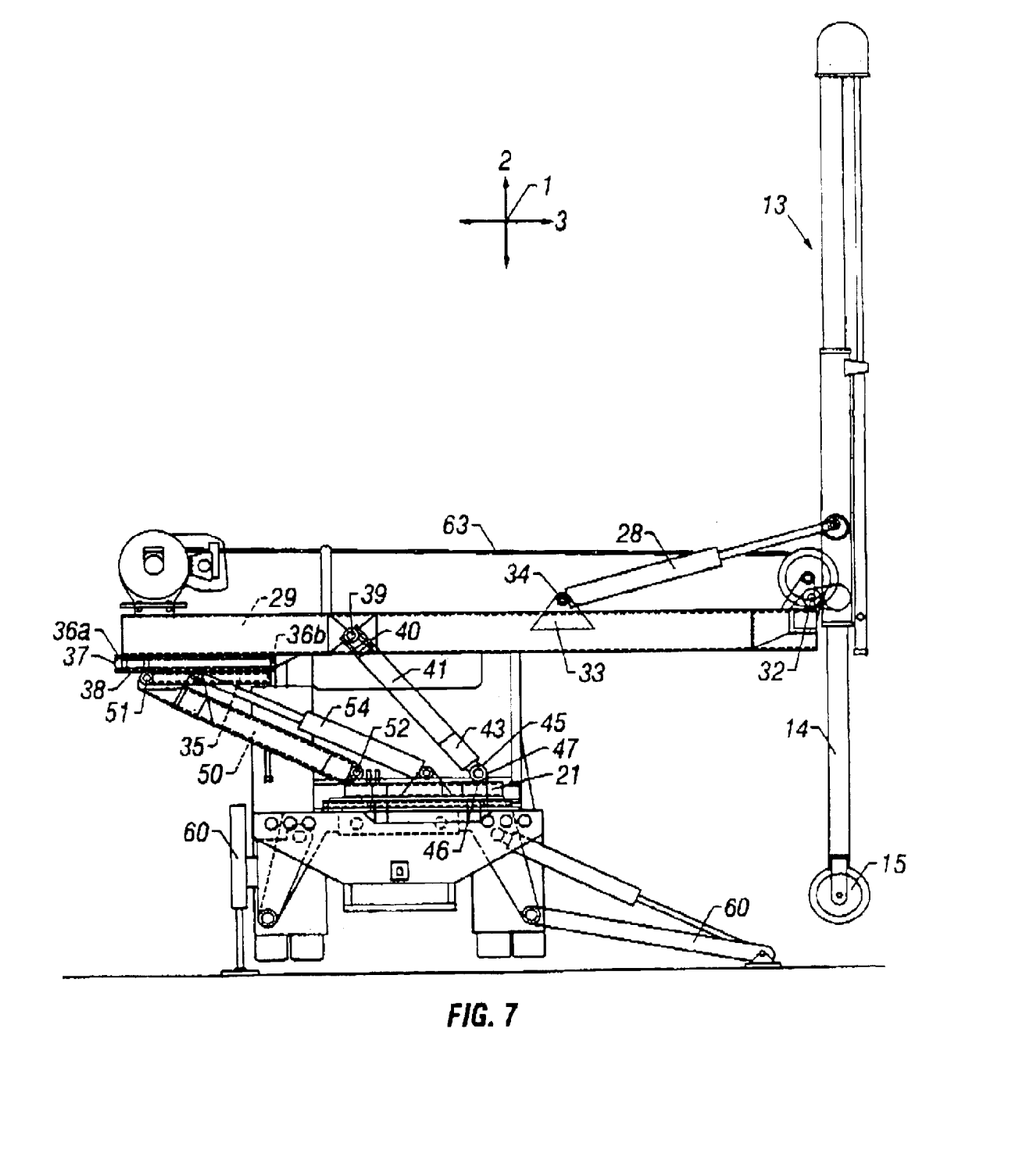
FIG. 7 is a rear elevation view of the articulated cable puller of FIG. 1 with the boom rotated out to the side of the truck and elevated to the vertical position.

With the boom assembly 13 rotated to a position over the manhole using the procedure described above, the operator is ready to raise the boom assembly 13 up to a vertical 2 or nearly vertical position, as illustrated in FIG. 7. In order to do so, the operator shifts the boom lift valve 27 of FIG. 6 such that oil flows into the base end of the boom lift cylinder 28. When oil flows into the base end of the boom lift cylinder 28, the boom lift cylinder extends rotating the entire boom assembly 13 around pin 32. The operator can stop the boom assembly 13 at any angle during this tilting process.

As illustrated in FIGS. 7 and 8a through 8c, the end of the load beam 29 opposite the end featuring ears 31 has a pair of ears 36a and 36b attached to its underside. A separate A-frame support piece 35 features a tube 38 attached to its top side. The load beam 29 is attached to A-frame 35 via ears 36a and 36b, pin 37 and tube 38. More specifically, tube 38 is positioned between the two ears 36a and 36b and pin 37 is placed through the first ear 36a, then through tube 38 and finally through the second ear 36b. This allows load beam 29 to rotate about pin 37, and thus horizontal axis 5 illustrated in FIGS. 8a and 8b, producing tilt or yaw of the boom assembly 13, as illustrated by double-headed arrow C in FIG. 8c.

Figure 8A:
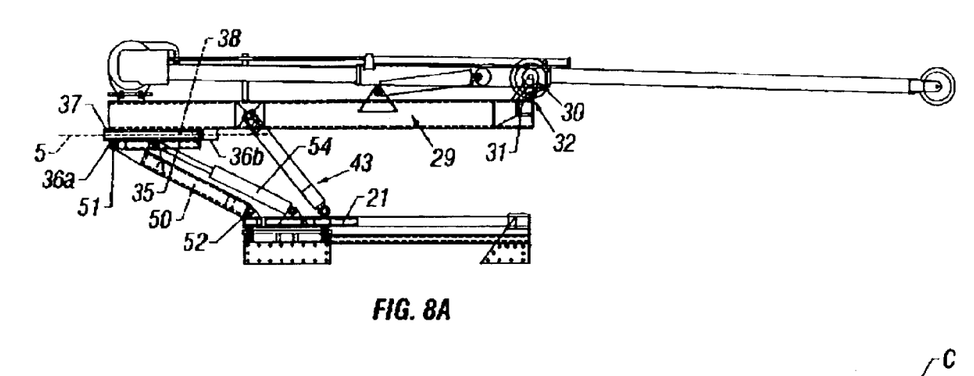
FIG. 8a is a side elevation view of the articulated cable puller of FIG. 1 removed from the truck.
Figure 8B:
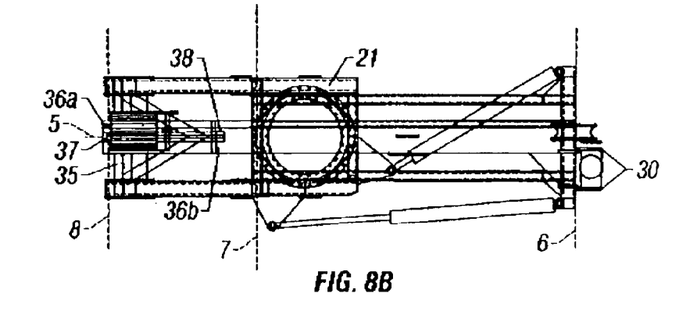
FIG. 8b is a top plan view of the articulated cable puller of FIG. 8a with the boom elevated to the vertical position.
Figure 8C:
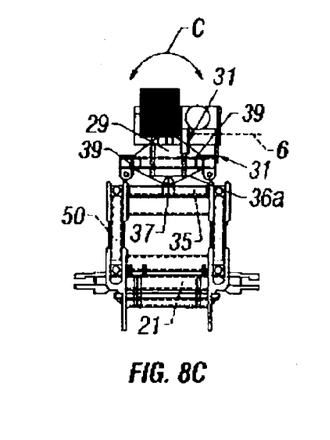
FIG. 8c is a rear elevation view of the articulated cable puller of FIG. 8a with the cylinders removed and the boom in the horizontal position.

As illustrated in FIGS. 7 and 8c, extending from the each side of the load beam 29 are cantilever pins 39. As illustrated in FIG. 7, the cantilever pins 39 are each connected to a universal type joint 40. The universal type joints 40 are connected to the rod ends of raise cylinders 41, 42 (42 shown in FIG. 6). The base end of each raise cylinder 41, 42 is connected to the base end of a yaw cylinder 43, 44 such that the cylinders are in line with each other. As illustrated in FIG. 7, the rod ends of yaw cylinders 43, 44 have a standard spherical bearing 45. Each spherical bearing 45 is captured between sets of ears 46, which are attached to base frame 21, by pins 47.

Referring to FIGS. 6 and 7, the operator may shift the driver's side yaw valve 48 to extend the driver's side yaw cylinder 43, which rotates the load beam 29 and boom assembly 13 about pin 37, and thus horizontal axis 5 in FIGS. 8a and 8b. This moves the sheave 15 in an arcuate path towards the rear of the truck, when the boom is positioned as shown in FIG. 7. This corresponds to tilting load beam 29 of FIG. 8c in a counter clockwise direction. If the operator shifts the passenger's side yaw valve 49 to extend the passengers side yaw cylinder 44, the load beam 29 and boom assembly 13 rotate about pin 37, moving the sheave 15 in an arcuate path toward of the front of the truck when the boom is positioned as shown in FIG. 7. This corresponds to tilting load beam 29 of FIG. 8c in a clockwise direction. Moving yaw valve 48 or yaw valve 49 to a position to retract their respective cylinders will move the sheave 15 in an arcuate path opposite to when the cylinder was extending.

As illustrated in FIGS. 7, 8a and 8c, a link 50 is connected to base frame 21 by pin 52 so as to rotate about horizontal axis 7 in FIG. 8b. Link 50 may be a rectangular framework of substantial width to be able transfer substantial loads to the base frame 21 from the force of the pulling cable 63. The A-frame 35, upon which the boom assembly 13 is pivotally mounted as described above, is connected to link 50 by pin 51 so as to rotate about horizontal axis 8 in FIG. 8b.

Link 50, base frame 21, the combination of raise cylinders 41, 42 and yaw cylinders 43, 44, and load beam 29 form a four bar mechanism that can be used to extend boom assembly 13 away from the truck. This four bar mechanism also lowers of the boom mounting end of load beam 29 in a curvilinear path toward the ground. The motion of this four bar linkage is controlled by the operator shifting extension cylinder valve 53 of FIG. 6. When the extension cylinder valve 53 is shifted such that oil flows from the pump 62 into the rod ends of extension cylinders 54, illustrated in FIGS. 6, 7 and 8a, the boom-mounting end of load beam 29 moves away from the truck, Conversely, if the extension cylinder valve 53 is shifted such that oil flows into the base ends of extension cylinders 54, the boom mounting end of load beam 29 moves toward the truck.

The link that is made up of the combination of raise cylinders 41, 42 and yaw cylinders 43,44 is an extensible link of this four bar linkage. Raise cylinders 41, 42 are extended when the operator shifts raise cylinder valve 55 of FIG. 6 such that oil flows to the divider/combiner valve 56. Flow will then go from the divider/combiner valve 56 into the base ends of raise cylinder 41 and raise cylinder 42. The divider/combiner valve 56 divides the oil going into raise cylinder 41 and raise cylinder 42 evenly such that they will extend at the same rate. Referring to FIG. 7, as the raise cylinders 41, 42 extend, the load beam 29 pivots around pin 51 in a counter clockwise direction, effectively raising the height of sheave 15 and extending the distance away from the truck.

Conversely, if the operator shifts raise cylinder valve 55 of FIG. 6 such that oil flows into the rod ends of the raise cylinders 41, 42, the load beam 29 of FIG. 7 pivots around pin 51 in a clockwise direction, effectively lowering the height of sheave 15. During this lowering operation oil flowing out of the base ends of raise cylinders 41, 42 is combined evenly in the divider/combiner valve 56 (FIG. 6) such that raise cylinder 41 and raise cylinder 42 will retract at the same rate.

All of the above-described motions allow the user to position the pulling sheave 15 over a manhole or any such other area where a cable is to be pulled. In the case of a manhole, being able to position the sheave 15 over the manhole by rotating the boom 14 around the truck and the ability to move the sheave extensibly away and toward the truck allows the boom 14 of the present invention to be positioned above the manhole anywhere within the cross-hatched area shown in FIG. 2.

Furthermore, with the boom 14 in a generally vertical position, as illustrated in FIG. 7, the portion of the boom 14 below pin 32 can be tilted with cylinder 28 around an axis defined by pin 32 both toward and away from the truck. The axis defined by pin 32 is illustrated at 6 in FIGS. 8b and 8c. Similarly, the yaw cylinders 43,44 operate to tilt the boom 14 about horizontal axis 5 of FIGS. 8a and 8b. This axis, which is an axis perpendicular to the axis 6 defined by pin 32, is defined by pin 37. These two axes define a generally horizontal plane.

Figure 9:
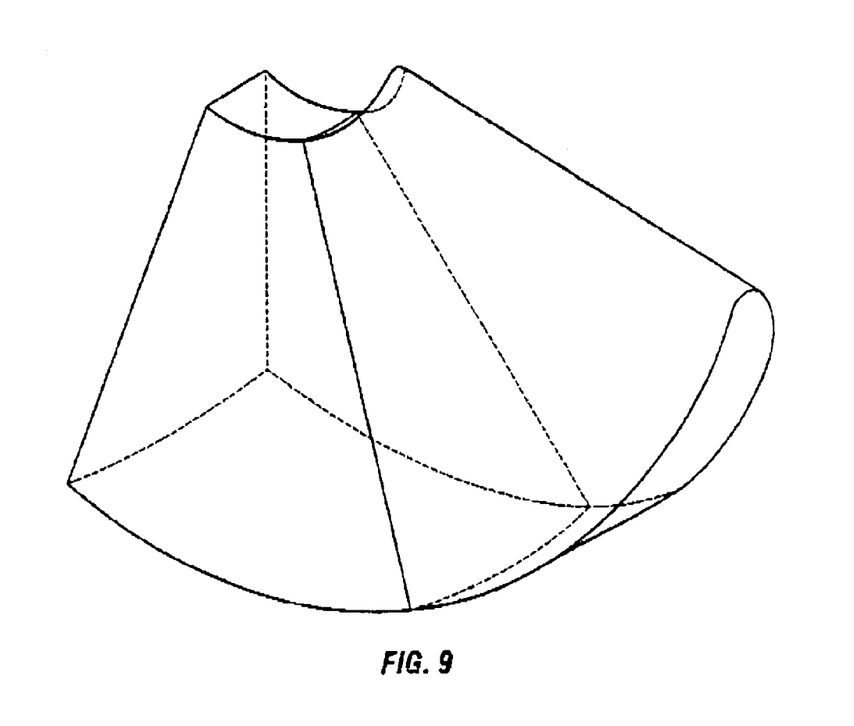
FIG. 9 is a perspective view showing the general volume shape that the pulling sheave of the articulated cable puller of FIG. 1 may be moved in with the portion that might be used in an underground vault with access through a manhole illustrated in phantom.

The extent of the motion of the sheave 15 at the bottom of the boom 14 in FIG. 7 encompasses a volume that is generally shown in FIG. 9. For reaching down a manhole, generally only the volume shown on the left in FIG. 9, illustrated in phantom, would be usable because of the restricted opening the boom 14 must go through.

Figure 10:
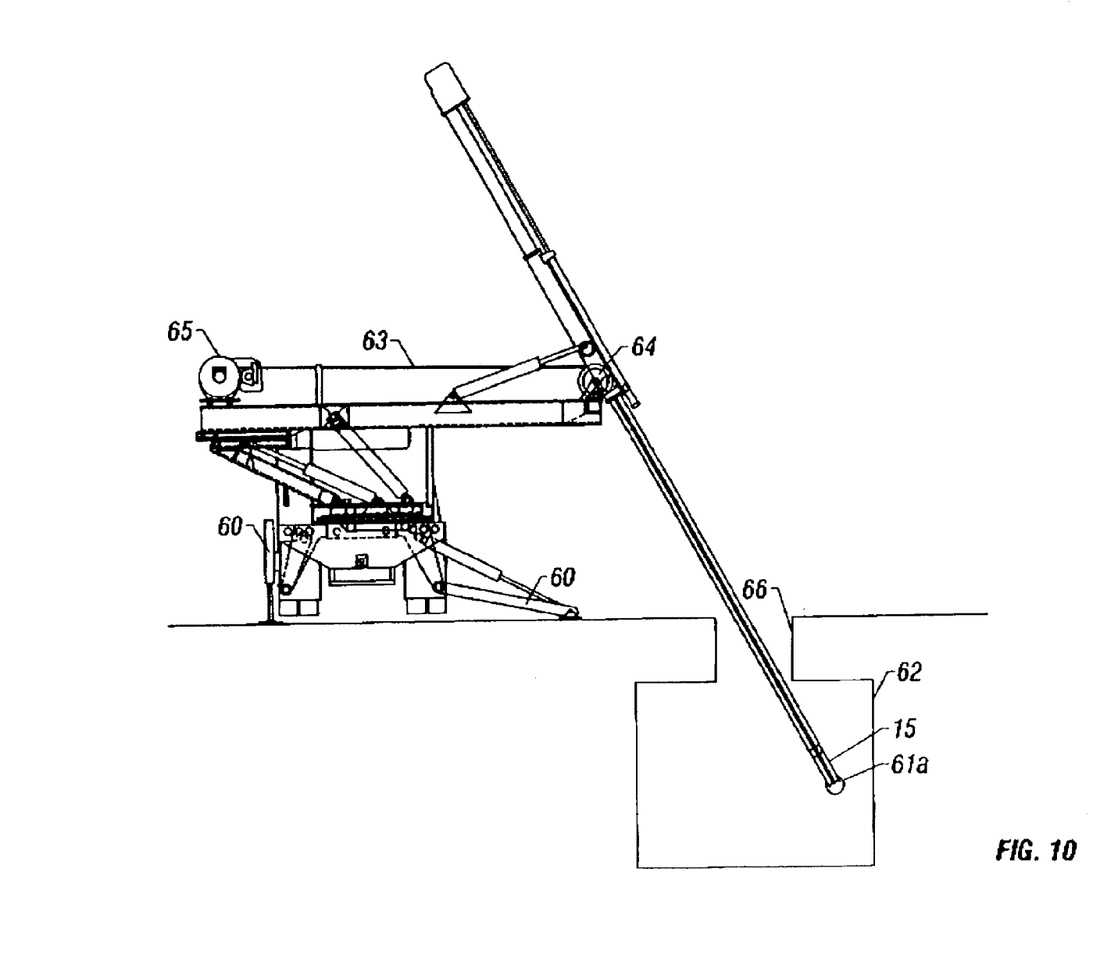
FIG. 10 is a side elevation view of the articulated cable puller of FIG. 1 suspended over the side of the truck, the boom entering a manhole at an angle to access a conduit in the vault beneath where the longitudinal axis of the conduit in plan view does not intersect the manhole opening.
Figure 11:
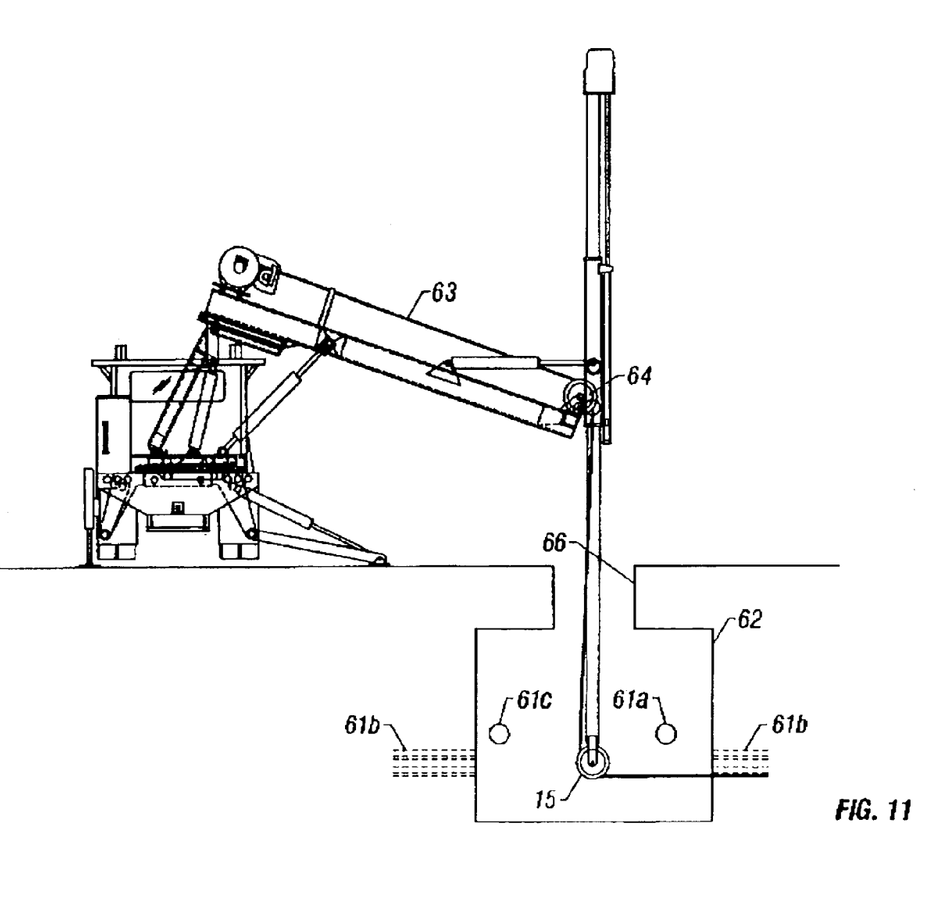
FIG. 11 is a side elevation view of the articulated cable puller of FIG. 1 suspended over the side of the truck, the boom entering a manhole in a generally vertical orientation to access a conduit in the vault beneath.
Figure 12:
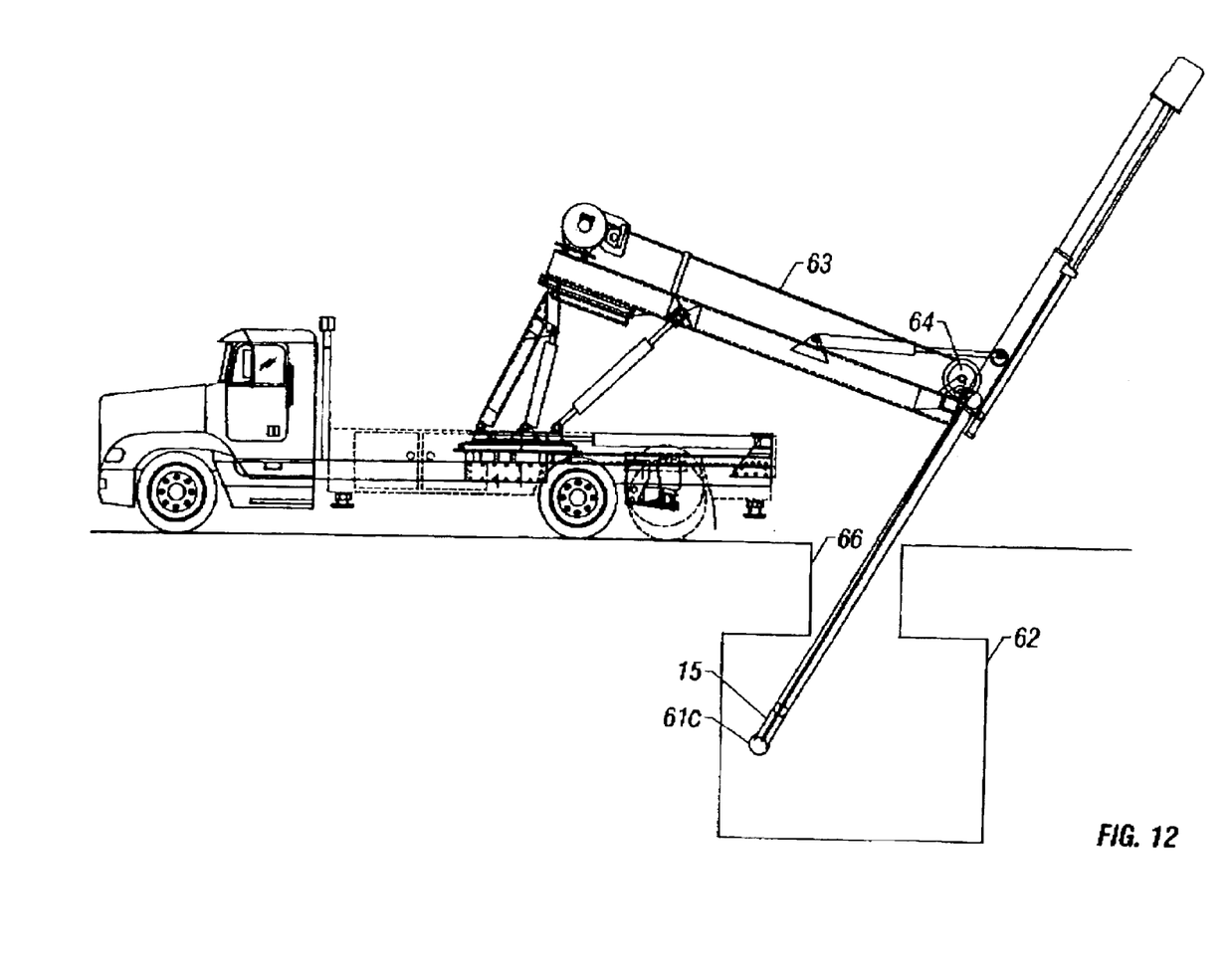
FIG. 12 is a side elevation view of the articulated cable-puller of FIG. 1 suspended over the rear of the truck and accessing a conduit where the longitudinal axis of the conduit in plan view does not intersect the manhole opening.

FIGS. 10, 11 and 12 illustrate how the pulling sheave 15 may be positioned next to, and horizontally aligned with, conduits 61a, 61b and 61c in an underground vault 62. As described previously, it is desirable to pull the cable in line with the conduit. This puts less stress on the winch line as it does not have to pass around sharp corners where it can be broken or chaffed. As known in the prior art, stabilizer legs, illustrated at 60 in FIG. 10, are extended to the ground to stabilize the truck. The stabilizer legs 60, shown extended from the passenger's side of the truck, support the truck a substantial distance from its side to keep the truck from overturning when pulling the cable from its side.

FIGS. 10 and 12 illustrate situations where the longitudinal axes of conduits, 61a and 61c, respectively, in plan view do not intersect the manhole opening 66. FIG. 10 illustrates the articulated cable puller accessing conduit 61a while being suspended over the passenger's side of the truck while FIG. 12 illustrates the articulated cable puller accessing conduit 61c while being suspended over the rear of the truck. FIG. 11 illustrates the articulated cable puller accessing conduit 61b, whose longitudinal axis does intersect the manhole opening 66 in plan view, while being suspended over the passenger's side of the truck.

After positioning the sheave by the appropriate conduit, the articulated cable puller 10 can now pull cable. The actual pulling of the line can be accomplished in several ways. With reference to FIGS. 10, 11 and 12, the winch line 63 is fed around sheave 64 and down to the pulling sheave 15. At this point the winch line can either be pulled back through the conduit 61a, 61b or 61c and attached to the cable to be pulled or attached to a line or rope already in the duct that is attached to the cable to be pulled. Both of these methods are readily known. The operator actuates the winch 65 and pulls the fiber optic cable, subduct for fiber optic cable, electric cable or other such cable as needs to be pulled. This procedure is repeated for long cable runs.

While the preferred embodiments of the invention have been shown and described, it will be apparent to those skilled in the art that changes and modifications may be made therein without departing from the spirit of the invention, the scope of which is defined by the appended claims.

What is claimed is:

1. An apparatus for pulling cable through a conduit comprising:
   a) a boom assembly having a load beam with a winding winch positioned thereon and a boom rotatably mounted thereon and a cable guiding device positioned on said boom, said boom rotatable between a generally parallel position and a generally perpendicular position with respect to the load beam;
   b) a movable base adapted to be mounted upon a vehicle so as to rotate relative to the vehicle about a vertical axis;
   c) said boom assembly mounted to said moveable base; and
   d) a swivel cylinder connected to a peripheral edge of said base and adapted to be connected to the vehicle so that when said swivel cylinder is activated, said base is rotated through an angle of less than 360°.

2. The apparatus of claim 1 further comprising a valve that is configured so that the swivel cylinder pushes said base and reconfigured so that the swivel cylinder pulls said base and means for reconfiguring said valve when a moment produced by the swivel cylinder on the base becomes approximately equal to zero.

3. The apparatus of claim 1 further comprising a second swivel cylinder so that said apparatus includes a pair of swivel cylinders connected to said base and adapted to be connected to the vehicle in such a position relative to one another that when said swivel cylinders are activated, said base is rotated with a relatively constant moment about the vertical axis.

4. The apparatus of claim 1 wherein said boom is extensible along its longitudinal axis.

5. An apparatus for pulling cable through a conduit comprising:
   a boom assembly having a load beam with a winding winch positioned thereon and a boom rotatably mounted thereon and a cable guiding device positioned on said boom, said boom rotatable between a generally parallel position and a generally perpendicular position with respect to the load beam;

a movable base adapted to be mounted upon a vehicle so as to rotate relative to the vehicle about a vertical axis; and c) said boom assembly mounted to said moveable base and pivotally mounted to said base so as to pivot about an axis that is parallel to the longitudinal axis of the load beam.

6. The apparatus of claim 5 further comprising a cylinder mounted between said boom assembly and said base and positioned so that when said cylinder is actuated, said boom assembly pivots about the axis that is parallel to the longitudinal axis of the load beam.

7. The apparatus of claim 1 wherein said boom assembly is pivotally mounted to said base so as to pivot about a horizontal axis that is perpendicular to a longitudinal axis of the boom.

8. The apparatus of claim 7 further comprising a cylinder mounted between the base and the boom assembly and positioned so that when said cylinder is actuated, said boom assembly pivots about the horizontal axis that is perpendicular to the longitudinal axis of the boom.

9. An apparatus for pulling cable through a conduit comprising:
   a) a boom assembly having a load beam with a winding winch positioned thereon and a boom rotatably mounted thereon and a cable guiding device positioned on said boom, said boom rotatable between a generally parallel position and a generally perpendicular position with respect to the load beam;
   b) a movable base adapted to be mounted upon a vehicle so as to rotate relative to the vehicle about a vertical axis; and
   c) said boom assembly mounted to said moveable base by a rigid link, said rigid link pivotally mounted to said base by a first end and about a horizontal axis that is perpendicular to a longitudinal axis of the boom and pivotally mounted to said boom assembly by a second end and about a horizontal axis that is perpendicular to the longitudinal axis of the boom.

10. The apparatus of claim 9 further comprising a cylinder mounted between said base and the boom assembly.

11. An apparatus for pulling a cable comprising:
   a) a boom assembly having a load beam with a boom rotatably mounted thereon and a cable guiding device positioned on said boom, said boom rotatable between a generally horizontal position and a generally vertical position;
   b) a movable base adapted to be mounted upon a vehicle so as to rotate relative to the vehicle about a vertical axis;
   c) a link mounted to the base at a first end so as to pivot relative to the base about a horizontal axis that is perpendicular to a longitudinal axis of the boom;
   d) a frame connected to a second end of the link that is opposite of the first end so as to pivot relative to the link about a horizontal axis that is perpendicular to the longitudinal axis of the boom;
   e) said boom assembly mounted to said frame so as to pivot relative to the frame about an axis that is parallel to the longitudinal axis of the boom;
   f) a cylinder attached between the base and a side of the boom assembly so that the boom assembly may be pivoted with respect to the frame; and
   g) a cylinder attached between the base and the boom assembly so that the link may be pivoted relative to the base and the boom assembly may be pivoted relative to the base and link.

12. The apparatus of claim 11 further comprising at least one swivel cylinder connected to said base and adapted to be connected to the vehicle so that when said swivel cylinder is activated, said base is rotated.

13. The apparatus of claim 12 further comprising a cam valve in communication with the swivel cylinder, said cam valve activating said swivel cylinder when actuated and said cam valve actuated when said base is rotated to a predetermined position.

14. The apparatus of claim 11 wherein said cylinder attached between the base and a side of the boom assembly includes aligned yaw and raise cylinders.

15. The apparatus of claim 11 wherein said boom is extensible along its longitudinal axis.

16. The apparatus of claim 11 wherein in said link is a rectangular framework.

17. The apparatus of claim 11 wherein said boom assembly includes downward extending ears and a tube is mounted to said frame so that said boom assembly is pivotally mounted to said frame by a pin passing through the ears and tube.

18. The apparatus of claim 9 where in said rigid link features a generally rectangular framework.

19. An apparatus for pulling cable through a conduit comprising:
   a) a boom assembly having a load beam with a winding winch positioned thereon and a boom rotatably mounted thereon and a cable guiding device positioned on said boom, said boom rotatable between a generally parallel position and a generally perpendicular position with respect to the load beam;
   b) a movable base adapted to be mounted upon a vehicle so as to rotate relative to the vehicle about a vertical axis; and
   c) said boom assembly mounted to said moveable base by two or more cylinders, each of said two or more cylinders being pivotally mounted to the movable base at positions that are spaced from one another by a maximum horizontal dimension that is less than the width of the vehicle.

* * * * *